May 16, 1933.  H. F. ALBIHN  1,909,158
PARACHUTE
Filed Nov. 18, 1926   2 Sheets-Sheet 1
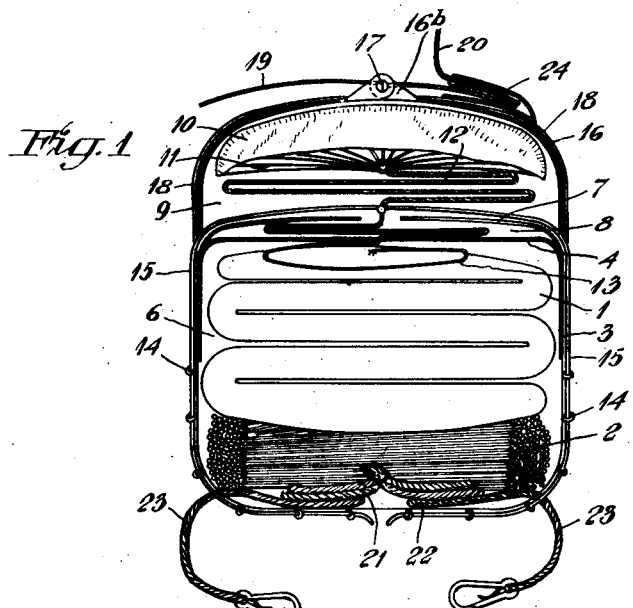

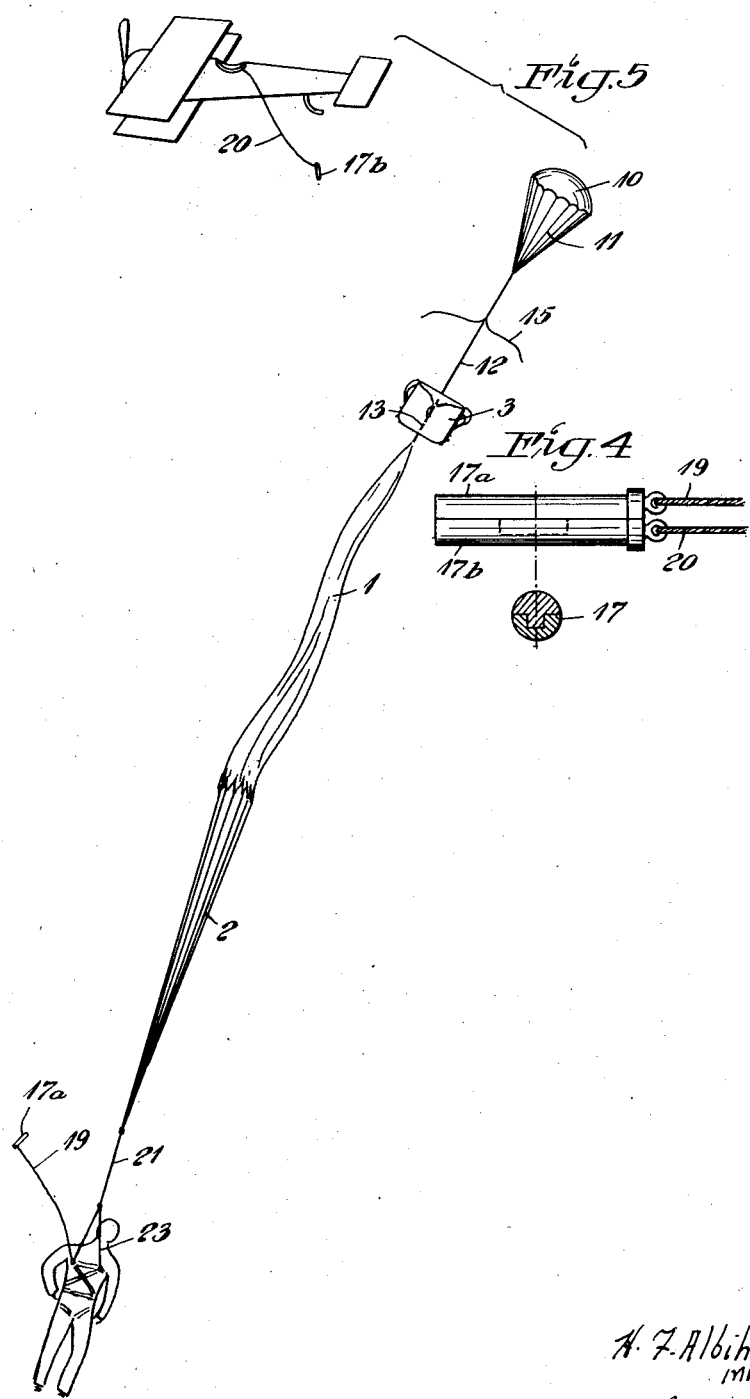

Patented May 16, 1933

1,909,158

UNITED STATES PATENT OFFICE

HARRY FREDRIK ALBIHN, OF STOCKHOLM, SWEDEN

PARACHUTE

Application filed November 18, 1926, Serial No. 149,218, and in Sweden August 25, 1926.

The present invention relates to parachutes and has particular reference to parachutes of the type comprising manually and automatically controllable means for effecting release of the parachute. More particularly, the invention relates to parachutes of the above character which comprise a main parachute and a pilot parachute.

With respect to their release from their packing casings, parachutes can be divided into two main groups, these being, first, automatic parachutes, that is to say parachutes of the type which are opened without action to release the same on the part of the parachutist, and, second, non-automatic parachutes, that is to say parachutes of the type which are opened only by an act of the parachutist. In automatic parachutes the release is usually effected by means of an opening line connecting the parachute with the aircraft or the like, said line opening the parachute casing or pulling the parachute out of said casing, whereas in non-automatic parachutes the release is effected, for instance, by the parachutist pulling a line at a suitable moment, thereby effecting the opening of the parachute. In practice the automatic parachute has proved superior to the non-automatic one, not the least on account of the fact that the parachute opens without it being necessary for the parachutist to rely upon his own presence of mind, but exceptional cases have nevertheless occurred, when the opening line has become entangled with the aircraft or the parachutist has become entangled with the line, with the result that the parachute has not opened or the parachutist has been injured. In addition to the difficulty mentioned above, that the release is dependent on the presence of mind of the parachutist, the non-automatic parachute also is subject to the weakness that for reasons which cannot be infallibly anticipated the releasing means may fail to function properly.

A principal object of the present invention is the provision of a parachute or aeronautical descending device which combines the advantages of the two types of devises mentioned above and which provides, among other features, an improved form of sealing and releasing means for the casing which is controllable to effect release of the parachute either manually or automatically and which is more reliable and consequently safer in operation than prior devices of like general character.

A further object of the present invention is to provide a parachute or aeronautical descending device of the type described in which all risks are eliminated of the opening line having any opportunity to cause injury to the parachutist, when for some reason or other the parachutist becomes entangled with the line. To this end said opening line must not be made too strong but only strong enough to be able, on an automatic release, to effect the opening of the parachute, but on the other hand so delicate that it will break before causing injury to the parachutist in case of accidents. Therefore, the tensile strength of the opening line should have a maximum value of 200 kilograms, but preferably said strength should be still less, for instance of a value of 60 to 80 kilograms, and in certain cases 30 to 40 kilograms. It is evident that it is not necessary that the line as such or in its entirety has such properties, this being the case only with a portion of the same, for instance with the portion nearest to the aircraft, or the means for attaching of the line to the aircraft may have the properties set forth.

Under certain circumstances it may be preferred to connect the body portion of the main parachute at its top with the auxiliary parachute or with any member connected thereto by means of a rupturable connection, for instance, a cord, of such a strength that it will be fractured, when the opening main parachute is stretched by the auxiliary parachute or by the opening line. This may be of great importance to prevent too rapid development of the main parachute so as to reduce the shock which occurs on opening. When using such a rupturable connection the strength thereof should be less than that of the opening line, that is to say, on opening, said connection should break before the opening line breaks.

A still further object of the invention is to provide improved sealing means for the casing enclosing the parachute or aeronautical descending device, such sealing means being the type which may be operated automatically as well as manually. With this object in view, the sealing means in accordance with the present invention comprises a plurality of elements withdrawable from apertures associated with the closing portions of the casing to effect release and consisting of two different parts, one part being directly connected with the opening line and the other part being directly connected with a line adapted to be operated by the parachutist.

By providing sealing means of this character in which release is effected through the medium of elements directly connected to releasing lines and withdrawable from apertures in the closing portions of the casing, a direct and positive releasing action of the sealing means is secured, which action is not dependent upon the rupturing of any tying lines or the like. The arrangement according to the present invention furthermore is extremely simple in construction and is of a type rendering negligible the possibility of premature accidental release, which possibility is present with devices involving latches, trips or the like.

Preferably, the two parts are arranged so that withdrawal of one part effects withdrawal of the other part so that whether the parachute is released automatically or manually, the descending parts are free from the aircraft.

The more detailed nature and objects of the invention will become apparent from a consideration of the following detailed description of one embodiment of the invention, reference being had to the accompanying drawings in which Fig. 1 shows diagrammatically a section through a parachute according to the present invention. Fig. 2 shows a view of the packed parachute seen from above. Fig. 3 shows a view in perspective of the packed parachute at the moment of release. Fig. 4 is a view and a cross section of sealing means for holding together the closing portions of a parachute casing, said figure being drawn to an enlarged scale. Fig. 5 illustrates the position of the parachute in the air immediately after the release.

With reference especially to Figs. 1, 2 and 3, the parachute consisting of the body portion 1 and of the supporting lines 2 is packed in a casing 3 having the form of a bag. A partition 4 divides the bag 3 into two compartments, a lower one 6 in which the body portion 1 and the supporting lines 2 are packed, and an upper one which is divided by means of flaps 7 into two chambers 8 and 9. Packed in the uppermost chamber 9 of the casing is an auxiliary parachute consisting of a body portion 10 and of supporting lines 11. Attached to the lower end of the supporting lines 11 is a line 12, one and preferably the greater portion of which is rolled up in the uppermost chamber 9, whereas the remaining and preferably the shorter portion of line 12 is packed in the lower chamber 8 of the upper compartment of the casing. In the embodiment shown the body portion 1 of the main parachute is connected at its top by means of a rupturable cord 13 with said partition 4 and, consequently, indirectly with the line 12 and the auxiliary parachute 10, 11. It should be observed, however, that it is not absolutely necessary to use such a rupturable connection.

At the base, the bag is split, and arranged in the edges of the flaps thus formed are rings 14 or other guiding members for a wire 15 drawn through the same for the purpose of sealing the bag at the base. The wire 15 is attached to line 12 at a suitable distance from that end thereof which is attached to the partition 4. At the top, the bag 3 is provided with closing portions comprising flaps 16 (in this embodiment four flaps are shown) of such form that, when folded in toward the center, they close the uppermost chamber 9 of the casing. The flaps 16 are provided with apertures 16a with which the sealing means is adapted to cooperate. In the embodiment illustrated, apertures 16a are in parts 16b which project when the casing is sealed, as shown in Fig. 1. The means for sealing the casing comprises the separable elements 17a and 17b adapted to be inserted in apertures 16a to seal the casing and withdrawable from the apertures to effect release. These elements provide sealing means having two different parts and for reasons which are hereinafter more fully described, the parts are preferably arranged so that withdrawal of one part will effect withdrawal of the other part. To this end, elements 17a and 17b are advantageously made so that when they are placed together they form, in effect, a bolt 17. Each of the flaps 16 is provided with elastic means, for instance an elastic ribbon 18 attached to the top of the flap and to the lower part of the casing, for drawing the flaps apart when the bolt 17 is removed.

Attached to one part 17a of the bolt 17 is a line 19 terminating in a member, for instance a ring, handle or the like adapted to be easily operated by the parachutist. Attached to the other part 17b of the bolt 17 is another line 20, the so-called opening line, which is secured at its other end to the aircraft. The lines 19 and 20 are guided in any suitable manner, for instance by a ring 27, so as to ensure reliable withdrawal of the bolt by pulling either one of the lines 19 or 20. The line 20 may be packed in any suitable manner, for instance, in a pocket 24 arranged outside one of the flaps 16. The two parts 17a and 17b of the bolt are detachably connected with each other in any desired manner, for instance, by means of a tongue and groove connection as shown in Fig. 4, so as to enable the bolt to be withdrawn by either one of the lines 19 or 20, and the parts to be separated immediately after the bolt has been withdrawn.

Attached to the connecting point of the supporting lines 2 of the main parachute is a line 21 which is packed in the lower compartment 6 of the casing, and secured to the other end of said line 21 are the shock absorber 22 and the attaching ropes 23.

In Fig. 5 is illustrated the course of development of the parachute described above. On account of the provision of two lines 19 and 20, the one 19 of which is adapted to be operated by the parachutist, when he has reached a given distance from the aircraft, while the other 20 serves to release the parachute automatically, the parachute may be opened in two different ways. The parachute opens automatically, as soon as the line 20 is stretched and the bolt 17 is withdrawn, and manually by the parachutist, when he pulls the handle, ring or the like serving for this purpose, and thereby withdraws the bolt 17. Immediately after the bolt 17 has been withdrawn, it is separated into its two parts 17a and 17b, whereby the parachute is no longer connected with the aircraft. When the bolt 17 has been withdrawn, the flaps 16 are drawn apart on account of the elastic means 18, the auxiliary parachute 10, 11 being thereby entirely free and immediately caught by the air. The line 12 is stretched and the wire 15 is pulled out of the rings 14, whereby the casing 3 is opened at the base. Then the lower portion of the line 12 secured to the wall 4 is also stretched, whereby the casing 3 is, so to say, pulled off from the main parachute, which then developes. If a rupturable cord 13 is used, the stretching of the line 12 will cause the body portion 1 and the supporting lines 2 of the main parachute to be stretched, and when these parts are stretched sufficiently and assume, for instance, the position shown in Fig. 5, a sudden jerk is produced, causing the rupturable cord 13 to be torn apart, whereupon the parachute will immediately open.

It is evident, that of the automatic and the non-automatic releasing devices that one will function which is first operated. It is suitable to lay particular stress on the automatic release and to rely upon the manual release only in case of accidents. Such accidents may occur, for instance, when the opening line 20 is entangled with the aircraft or with the body of the parachutist and is thus caused to break or to be detached, in which case the parachutist still has an opportunity to cause the parachute to open by using the manually operable releasing device which should be easy to operate both by the right and the left hand of the parachutist. If the parachutist is entangled with the line 20, the strength of said line is such, as mentioned above, that the line will break before it has had time to cause injury to the parachutist.

If it is desired to lay particular stress on the manual release and, consequently, rely upon the automatic release only in such cases when the manually operated releasing device fails to function for some reason or other, the length of the opening line 20 should, of course, be such that the line 20 does not become stretched until somewhat after the moment when the parachutist should pull the releasing ring according to given instructions. The manually operated releasing device may fail to function, for instance, when the line 19 has become locked, so that the bolt 17 cannot be withdrawn by the parachutist, or when the parachutist, on jumping out, is rendered unconscious, for instance, by striking against the aircraft. In such case, the parachute will open nevertheless, the bolt 17 being withdrawn by the line 20 connected to the aircraft, immediately after said line has been stretched.

As will be apparent from the above description, a parachute according to the present invention provides doubled safety. Consequently, in every instance when the manual release is the primary one and also when the automatic release is the primary one, it should be stated in the instructions to the parachutist that he should, in all cases, pull the releasing ring, regardless of whether or not there is an indication that the parachute has already opened automatically.

What I claim as new and desire to secure by Letters Patent of the United States of America is:—

1. An aeronautical descending device comprising a main parachute and an auxiliary parachute, each consisting of a body portion and supporting lines, a casing adapted to enclose said parachutes, manually and automatically controllable means to release said auxiliary parachute and means connected with said auxiliary parachute to release said main parachute, said last mentioned releasing means comprising a rupturable connection between the two parachutes adapted to be fractured, when, on opening, the main parachute has been stretched.

2. An aeronautical descending device comprising a main parachute and an auxiliary parachute, each consisting of a body portion and supporting lines, a casing adapted to enclose said parachutes, an opening line adapted to connect the descending device with the aircraft, means controlled manually as well as by said opening line to release said auxiliary parachute from said casing, and means connected with said auxiliary parachute to release said main parachute from said casing, said last mentioned means comprising a rupturable connection between the two parachutes, adapted to be fractured when, on opening, the main parachute has been stretched, the tensile strength of said connection being less than that of said opening line.

3. An aeronautical descending device comprising a main parachute and an auxiliary parachute, each consisting of a body portion and supporting lines, a casing adapted to enclose said parachutes, an opening line adapted to connect the descending device with the aircraft, means controlled manually as well as by said opening line to release said auxiliary parachute, and means connected with said auxiliary parachute to release said main parachute, said last mentioned means comprising a rupturable connection between the two parachutes adapted to be fractured when, on opening, the main parachute has been stretched, said opening line being adapted to be broken or detached by a tensile stress of maximum 200 kilograms.

4. A parachute comprising a body portion, supporting lines, a casing adapted to enclose said body portion and supporting lines, means to seal said casing, an opening line adapted to connect the parachute with the aircraft for controlling said sealing means automatically, and a member adapted to be operated by the parachutist for controlling said sealing means manually, said sealing means comprising two parts, one connected with said opening line and the other with said member and which parts are so arranged in relation to each other that a release of one part effects the release of the other.

5. A parachute comprising a body portion, supporting lines, a casing adapted to enclose said body portion and supporting lines, means to seal said casing, an opening line adapted to connect the parachute with the aircraft for controlling said sealing means automatically, a member adapted to be operated by the parachutist for controlling said sealing means manually, said sealing means comprising two members which form together a bolt and are positively connected with each other in the sealing position of the bolt but separated, when the bolt is drawn out.

6. A device for descending from an aircraft comprising a main parachute and an auxiliary parachute, a casing adapted to enclose said main parachute, separable manually and automatically controllable releasing means for releasing said auxiliary parachute and means connected with said auxiliary parachute for opening the casing to release said main parachute, said releasing means being so arranged that the operation of one of said separable releasing means will entirely disconnect the other of the separable releasing means from the releasing means which has been operated.

7. A device for descending from an aircraft comprising a main parachute and an auxiliary parachute, a casing, a chamber in said casing adapted to enclose said main parachute, a second chamber in said casing adapted to enclose said auxiliary parachute, sealing means for both chambers, an opening line adapted to connect the sealing means of said second chamber with the aircraft for releasing the auxiliary parachute automatically, a member adapted to be operated by the parachutist to release the auxiliary parachute manually and means connected to said auxiliary parachute to control the sealing means of the first mentioned chamber in order to release the main parachute, said opening line and said member being so arranged that the operation of one thereof will entirely disconnect the other from the one which has been operated.

8. A device for descending from an aircraft comprising a main parachute and an auxiliary parachute, a casing adapted to enclose said main parachute, separable manually and automatically controllable releasing means for releasing said auxiliary parachute and means connected with said auxiliary parachute for opening the casing to release said main parachute, said releasing means being so arranged that operation of the manually controllable releasing means will entirely disconnect the automatically controllable releasing means from the manually controllable releasing means.

9. In apparatus of the character described, a casing having closing portions for closing the casing, sealing means comprising a plurality of withdrawable elements constituting two different parts of the sealing means, said parts cooperating with a plurality of said closing portions to seal the casing and both parts of the sealing means being required to be in cooperative relation with respect to the casing to ensure sealing of the casing, and two independent lines attached to said sealing elements for withdrawing the same, one of said lines being operable to directly release one part of said sealing means, the other of said lines being operable to directly release the other part of said sealing means, and the release of either of said parts rendering the other part ineffective to maintain said casing in closed state.

10. In apparatus of the character described, a casing having closing portions for closing the casing, means associated with said closing portions having apertures therethrough, sealing means comprising a plurality of withdrawable elements passing through said apertures to seal the casing, and two independent releasing lines, each of said lines being directly attached to a different part of said sealing means and operable by direct withdrawal of the part to which it is attached to render the other part of the sealing means inoperative to maintain the casing in closed state.

11. In apparatus of the character described, a casing having closing portions for closing the casing, means associated with said closing portions providing projections having apertures therethrough, sealing means comprising a plurality of withdrawable elements passing through said apertures to hold the apertured parts in sealing relationship, and two independent releasing lines, said lines being attached to different elements constituting different parts of said sealing means and each of said means being operable to directly withdraw the part of the sealing means to which it is attached and upon withdrawal thereof to render the other part of the sealing means inoperative to maintain said casing in closed state.

In testimony whereof I have affixed my signature.

HARRY FREDRIK ALBIHN.